(12) United States Patent
Oh et al.

(10) Patent No.: US 7,936,410 B2
(45) Date of Patent: May 3, 2011

(54) ARRAY SUBSTRATE, DISPLAY APPARATUS HAVING THE SAME AND METHOD FOR REPAIRING THE SAME

(75) Inventors: Joon-Hak Oh, Seoul (KR); Keun-Kyu Song, Yongin-si (KR); Young-Chol Yang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1404 days.

(21) Appl. No.: 11/249,378

(22) Filed: Oct. 14, 2005

(65) Prior Publication Data
US 2006/0124966 A1    Jun. 15, 2006

(30) Foreign Application Priority Data

Dec. 10, 2004 (KR) .................. 10-2004-0104225

(51) Int. Cl.
*G02F 1/1333* (2006.01)
*G02F 1/1343* (2006.01)
(52) U.S. Cl. .......................... 349/54; 349/55
(58) Field of Classification Search .................. 349/152, 349/54–55
See application file for complete search history.

(56) References Cited

U.S. PATENT DOCUMENTS

| 6,380,992 B1* | 4/2002 | Lee ................................. 349/54 |
| 6,856,374 B1* | 2/2005 | Ozaki et al. .................... 349/192 |

FOREIGN PATENT DOCUMENTS

| CN | 1527268 A | 9/2004 |
| KR | 1999-0081248 A | 11/1999 |

* cited by examiner

*Primary Examiner* — David Nelms
*Assistant Examiner* — Nathanael R Briggs
(74) *Attorney, Agent, or Firm* — Cantor Colburn LLP

(57) ABSTRACT

In an array substrate, a display apparatus having the same and a method for repairing the same, a substrate includes a display area and a peripheral area that is adjacent to the display area. A plurality of signal transmitting lines are formed in the peripheral area of the substrate. A plurality of signal lines are formed in the display area of the substrate and connected to the signal transmitting lines. A repair part is formed in the peripheral area of the substrate. The repair part intersects and is insulated from the signal transmitting lines so as to repair a first opened signal transmitting line of the signal transmitting lines. Thus, the array substrate may be produced in high-yield and prevent signal distortion.

23 Claims, 7 Drawing Sheets

ARRAY SUBSTRATE, DISPLAY APPARATUS HAVING THE SAME AND METHOD FOR REPAIRING THE SAME

CROSS-REFERENCE TO RELATED APPLICATION

This application claims priority to and the benefit of Korean Patent Application No. 2004-104225 filed on Dec. 10, 2004, which is hereby incorporated by reference for all purposes as if fully set forth herein.

BACKGROUND OF THE INVENTION

1. Field of the Invention

The present invention relates to an array substrate, a display apparatus having the same and a method for repairing the same. More particularly, the present invention relates to an array substrate capable of increasing manufacturing yield of a display apparatus, a display apparatus having the array substrate and a method for repairing the array substrate.

2. Description of the Related Art

In general, a liquid crystal display (LCD) apparatus includes a display panel having an array substrate, an opposite substrate facing the array substrate and a liquid crystal layer disposed between the array substrate and the opposite substrate.

The array substrate includes a plurality of gate lines and a plurality of data lines provided in a display area thereof. The display panel includes a gate driving chip and a data driving chip provided in a peripheral area thereof. The gate driving chip outputs a gate signal and the data driving chip outputs a data signal.

The gate driving chip is connected with the gate lines by a plurality of gate signal transmitting lines disposed therebetween, so that the gate signal is transmitted to the gate lines via the gate signal transmitting lines.

Similarly, the data driving chip is connected with the data lines by a plurality of data signal transmitting lines disposed therebetween, so that the data signal is transmitted to the data lines via the data signal transmitting lines.

Typically, the gate and date signal transmitting lines are bent in the peripheral area. However, the gate and data signal transmitting lines are opened at the bent portion thereof, thereby decreasing a manufacturing yield of the display panel is deteriorated.

SUMMARY OF THE INVENTION

The present invention provides an array substrate capable of improving a manufacturing yield and preventing signal distortion.

Additional features of the invention will be set forth in the description which follows, and in part will be apparent from the description, or may be learned by practice of the invention.

The present invention discloses an array substrate, including a substrate including a display area and a peripheral area that is adjacent to the display area; a first signal line provided at the peripheral area of the substrate to receive a driving signal; a second signal line provided at the display area, the second signal line coupled with the first signal line to receive the driving signal; a pixel array provided at the display area that receives the driving signal from the second signal line; and a crossing part provided at the peripheral area, the crossing part intersecting and insulated from the first signal line.

The present invention also discloses a display apparatus, including an array substrate having a substrate with a display area and a peripheral area that is adjacent to the display area, a first gate signal line provided at the peripheral area to receive the gate signal from the gate driving chip; a first data signal line provided at the peripheral area to receive the data signal from the data driving chip; a second gate line provided at the display area, the second gate line being coupled with the first gate signal line to receive the gate signal from the first gate signal line; a second data line provided at the display area of the substrate, the data line being coupled with the first data signal lines to receive the data signal from the first data signal line; a gate side repair part to repair a first opened gate signal line; a dummy gate side repair part to repair a second opened gate signal line; a data side repair part to repair an opened first data signal line; and a dummy data side repair part to repair a second opened first data signal line; an opposite substrate corresponding to the array substrate; a gate driving chip provided at the array substrate to transmit a gate signal; and a data driving chip provided at the array substrate to transmit a data signal.

The present invention also discloses a method for repairing an array substrate, including irradiating a first laser beam upon a first overlap portion where a first end portion of an opened signal line overlaps a first repair line to couple the opened signal line with the first repair line; irradiating a second laser beam upon a second overlap portion where a second end portion of the opened signal line overlaps a second repair line to couple the opened signal line with the second repair line; irradiating a third laser beam upon a third overlap portion where an end portion of the first repair line overlaps a connecting line to couple the first repair line with the connecting line; and irradiating a fourth laser beam upon a fourth overlap portion where an end portion of the second repair line overlaps the connecting line, to couple the second repair line with the connecting line.

The present invention also discloses a method for repairing an array substrate, including irradiating a first laser beam upon a first overlap portion where a first end portion of an opened signal line overlaps a first repair line to couple the first repair line with the opened signal line; and irradiating a second laser beam upon a second overlap portion of a second end portion of the opened signal line that overlaps a second repair line coupled with the first repair line to couple the second repair line with the opened signal line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DESCRIPTION OF THE ILLUSTRATED EMBODIMENTS

Figure 1:
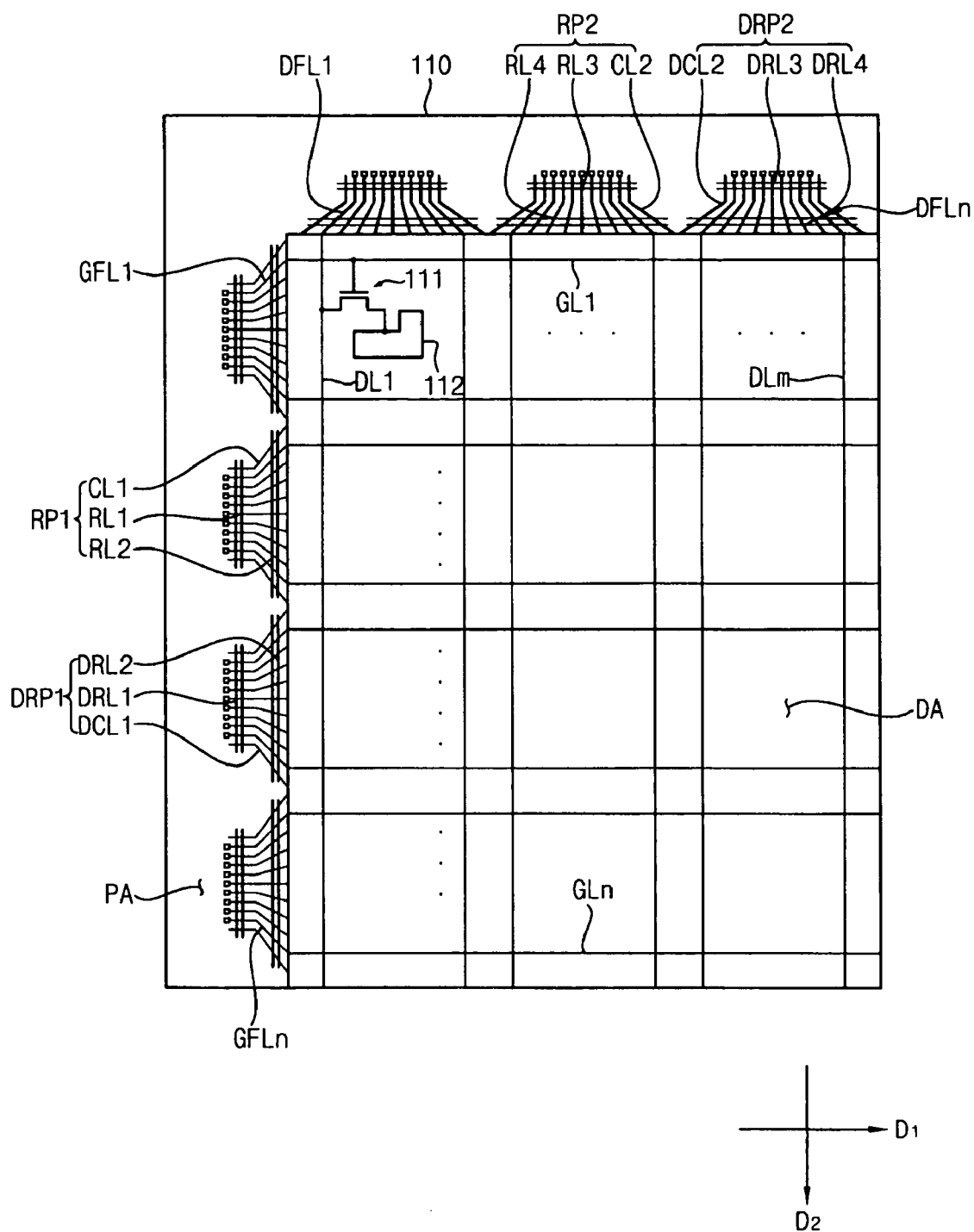
FIG. 1 is a plan view showing an array substrate according to an embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity.

FIG. 1 is a plan view showing an array substrate according to an embodiment of the present invention. Referring to FIG. 1, an array substrate 101 includes a substrate 110 divided into a display area DA and a peripheral area PA that is adjacent to the display area DA.

A plurality of gate lines GL1~GLn and a plurality of data lines DL1~DLm are formed in the display area DA of the substrate 110, wherein n and m are positive integers. The gate lines GL1~GLn extend along a first direction D1 and the data lines DL1~DLm extend along a second direction D2 that is substantially perpendicular to the first direction D1. The gate lines GL1~GLn and the data lines DL1~DLm may be provided on a different layer from each other, so that the gate lines GL1~GLn and the data lines DL1~DLm are electrically insulated from each other.

A plurality of thin film transistors and a plurality of pixel electrodes are formed at the display area DA of the substrate 110 in a substantially matrix-like shape. For example, a first thin film transistor 111 has a gate electrode electrically connected, e.g., coupled, with a first gate line GL1 of the gate lines GL1~GLn, a source electrode electrically connected, e.g., coupled, with a data line DL1 of the data lines DL1~DLm, and a drain electrode electrically connected, e.g., coupled, with a first pixel electrode 112.

A plurality of gate signal transmitting lines GFL1~GFLn and a plurality of data signal transmitting lines DFL1~DFLm are formed at the peripheral area PA of the substrate 110. The gate signal transmitting lines GFL1~GFLn are electrically connected, e.g., coupled, with an end portion of the gate lines GL1~GLn. A gate signal from the gate signal transmitting lines GFL1~GFLn may be transmitted to the gate lines GL1~GLn. The gate signal transmitting lines GFL1~GFLn and the gate lines GL1~GLn may be formed on the same layer.

Alternatively, the data signal transmitting lines DFL1~DFLm may be electrically connected, e.g., coupled, with an end portion of the data lines DL1~DLm. A data signal from the data signal transmitting lines DFL1~DFLm may be transmitted to the data lines DL1~DLm. The data signal transmitting lines DFL1~DFLm and the data lines DL1~DLm may be formed on the same layer.

In the present embodiment, a distance between the gate signal transmitting lines GFL1~GFLn is less than a distance between the gate lines GL1~GLn. Also, a distance between the data signal transmitting lines DFL1~DFLm is less than a distance between the data lines DL1~DLm. Accordingly, the gate signal transmitting lines GFL1~GFLn are divided into four groups having a substantially fan-like shape, and the data signal transmitting lines DFL1~DFLm are divided into three groups having a substantially fan-like shape.

A first repair part RP1 and a second repair part RP2 may be formed at the peripheral area PA of the first substrate 110. The first repair part RP1 repairs a first opened gate signal transmitting line of the gate signal transmitting lines GFL1~GFLn. The second repair part RP2 repairs a first opened data side signal transmitting line of the data signal transmitting lines DFL1~DFLm.

The first repair part RP1 includes a first repair line RL1, a second repair line RL2, and a first connecting line CL1. The first repair line RL1 and the second repair line RL2 are formed on a different layer from the layer on which the gate signal transmitting lines GFL1~GFLn are formed. Also, the first repair line RL1 intersects and is insulated from first end portions of the gate signal transmitting lines GFL1~GFLn. The second repair line RL2 intersects and is insulated from second end portions of the gate signal transmitting lines GFL1~GFLn.

The first connecting line CL1 and the gate signal transmitting lines GFL1~GFLn may be formed on a same layer. A first end portion of the first connecting line CL1 intersects and is insulated from an end portion of the first repair line RL1, and a second end portion of the first connecting line CL1 intersects and is insulated from an end portion of the second repair line RL2.

As shown in FIG. 1, the gate signal transmitting lines GFL1~GFLn may be divided into four groups, and the first repair line RL1 and the second repair line RL2 may also be divided into four groups. The first connecting line CL1 intersects and is insulated from the first repair line RL1 and the second repair line RL2 divided into four groups. Thus, the first repair part RP1 may repair the four groups of the gate signal transmitting lines GFL1~GFLn.

A first dummy repair part DRP1 is provided at the peripheral area PA of the substrate 110 to repair a second opened gate signal transmitting line of the gate signal transmitting lines GFL1~GFLn. The first dummy repair part DRP1 includes a first dummy repair line DRL1, a second dummy repair line DRL2, and a first dummy connecting line DCL1. The first dummy repair part DRP1 has substantially the same structure as the first repair part RP1, and thus a detailed description of the first dummy repair part DRP1 is not necessary for purposes of convenience.

The second repair part RP2 includes a third repair line RL3, a fourth repair line RL4, and a second connecting line CL2. The third repair line RL3 and the fourth repair line RL4 may be formed on a different layer from a layer on which the data signal transmitting lines DFL1~DFLm are formed. The third repair line RL3 intersects and is insulated from first end portions of the data signal transmitting lines DFL1~DFLm. The fourth repair line RL4 intersects and is insulated from second end portions of the data signal transmitting lines DFL1~DFLm.

The second connecting line CL2 and the data signal transmitting lines DFL1~DFLm may be formed on the same layer. A first end portion of the second connecting line CL2 intersects an end portion of the third repair line RL3 and a second end portion of the second connecting line CL2 intersects an end portion of the fourth repair line RL4.

As shown in FIG. 1, the data signal transmitting lines DFL1~DFLm may be divided into three groups, and the third repair line RL3 and the fourth repair line RL4 may be divided into three groups. The second connecting line CL2 intersects and is insulated from the third repair line RL3 and the fourth repair line RL4 divided into three groups. Thus the second repair part RP2 may repair the three groups of the data signal transmitting lines DFL1~DFLm.

A second dummy repair part DRP2 may be provided at the peripheral area PA of the substrate 110 to repair a second opened data signal transmitting line of the data signal transmitting lines DFL1~DFLm. The second dummy DRP2 may include a third dummy repair line DRL3, a fourth dummy repair line DRL4 and a second dummy repair line DCL2. The second dummy repair part DRP2 has substantially the same structure as the second repair part RP2, and thus a detailed description of the second dummy repair part DRP2 is not necessary for purposes of convenience.

Figure 2:
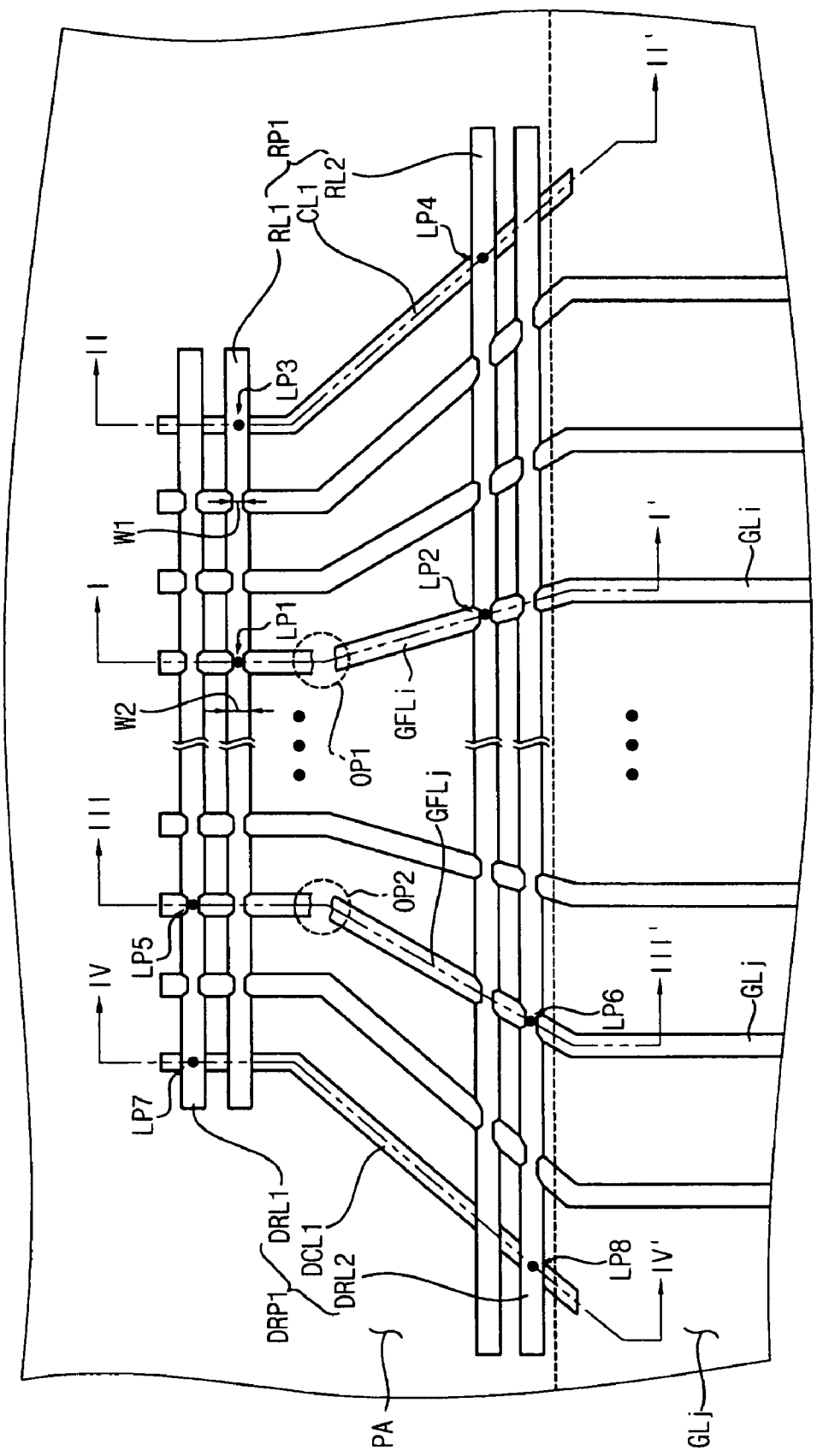
FIG. 2 is an enlarged plan view showing the gate signal transmitting lines of FIG. 1.

FIG. 2 is an enlarged plan view showing the gate signal transmitting lines of FIG. 1. Referring to FIG. 2, the gate signal transmitting lines GFLi and GFLj may be formed at the peripheral area PA and a plurality of gate lines GLi and GLj extending from the gate signal transmitting lines GFLi and GFLj may be formed at the display area DA, wherein i and j are positive integers. A first repair part RP1 and a dummy first repair part DRP1 may be formed at the peripheral area PA to repair the gate signal transmitting lines GFLi and GFLj. The first repair part RP1 may include a first repair line RL1, a second repair line RL2, and a first connecting line CL1. The first dummy repair part DRP1 may include a first dummy repair line DRL1, a second dummy repair line DRL2, and a first dummy connecting line DCL1.

When an i-th gate signal transmitting line GFLi and a j-th gate signal transmitting line GFLj are opened at a first opened area PO1 and a second opened area OP2, respectively, the first repair part RP 1 repairs the i-th gate signal transmitting line GFLi and the second repair part RP2 repairs the j-th gate signal transmitting line GFLj.

Figure 3:
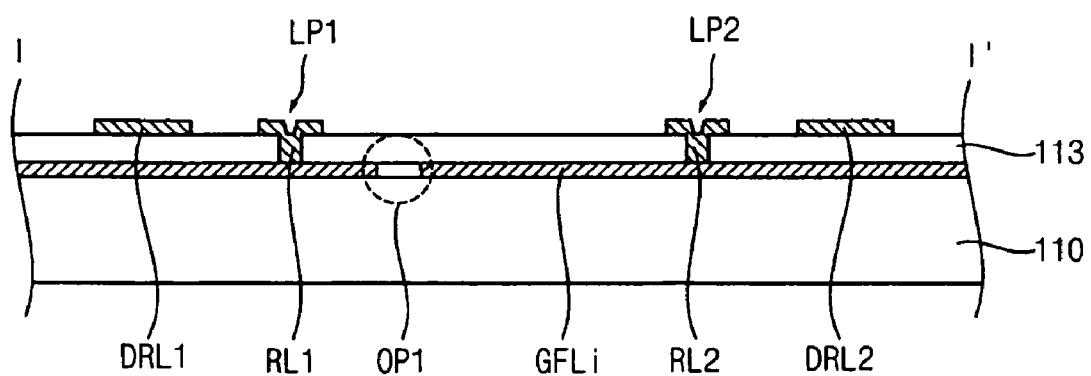
FIG. 3 is a cross-sectional view taken along a line I-I' in FIG. 2.
Figure 4:
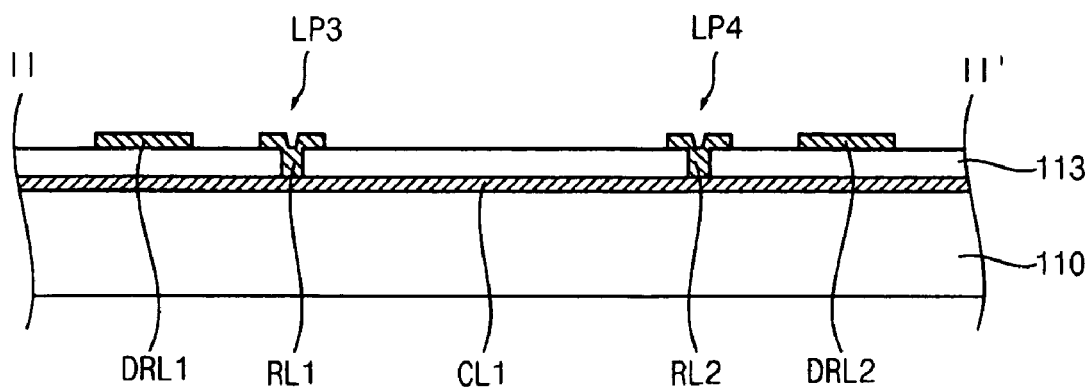
FIG. 4 is a cross-sectional view taken along a line II-II' in FIG. 2.

A process of repairing the i-th gate signal transmitting line GFLi is described below with reference to FIG. 3. FIG. 3 is a cross-sectional view taken along a line I-I' shown in FIG. 2. FIG. 4 is a cross-sectional view taken along a line II-II' shown in FIG. 2.

Referring to FIG. 2 and FIG. 3, the first repair line RL1 is electrically insulated from a first end portion of the i-th gate signal transmitting line GFLi by a first insulating layer 113 and overlapped or crossed with the first end portion of the i-th gate signal transmitting line GFLi. The second repair line RL2 is electrically insulated from a second end portion of the i-th gate signal transmitting line GFLi by the first insulating layer 113 and is overlapped or crossed with the second end portion of the i-th gate signal transmitting line GFLi. When a laser beam is irradiated upon the overlapped portions, the first repair line RL1 may be electrically connected, e.g., coupled, with the first end portion of the i-th gate signal transmitting line GFLi at substantially a first laser point LP1 where the first repair line RL1 is overlapped or crossed with the first end portion, and the second repair line RL2 may be electrically connected, e.g., coupled, with the second end portion of the i-th gate signal transmitting line GFLi at substantially a second laser point LP2 where the second repair line RL2 is overlapped or crossed with the second end portion.

As shown in FIG. 2 and FIG. 4, the first connecting line CL1 is electrically insulated from the first repair line RL1 and the second repair line RL2 by the first insulating layer 113. The first connecting line CL1 may be electrically connected, e.g., coupled, with the first repair line RL1 when a laser beam is irradiated onto a third laser point LP3 where the first connecting line CL1 overlaps the first repair line RL1. The first connecting line CL1 may be electrically connected, e.g., coupled, with the second repair line RL2 when a laser beam is irradiated upon a fourth laser point LP4 where the first connecting line CL1 overlaps the second repair line RL2.

The first connecting line CL1 is formed on a different layer from a layer on which the first repair line RL1 and the second repair line RL2 and is electrically connected, e.g., coupled, with the first repair line RL1 and the second repair line RL2 through a process of irradiating a laser beam.

Accordingly, the first end portion and the second end portion of the i-th gate signal transmitting line GFLi are electrically connected, e.g., coupled, with each other via the first repair part RP1. Therefore, a gate signal from the first end portion of the i-th gate signal transmitting line GFLi is transmitted to an i-th gate line after sequentially passing through the first repair line RL1, the first connecting line CL1, and the second repair line RL2.

A process of repairing the j-th gate signal transmitting line GFLj is described below with reference to FIG. 5.

Figure 5:
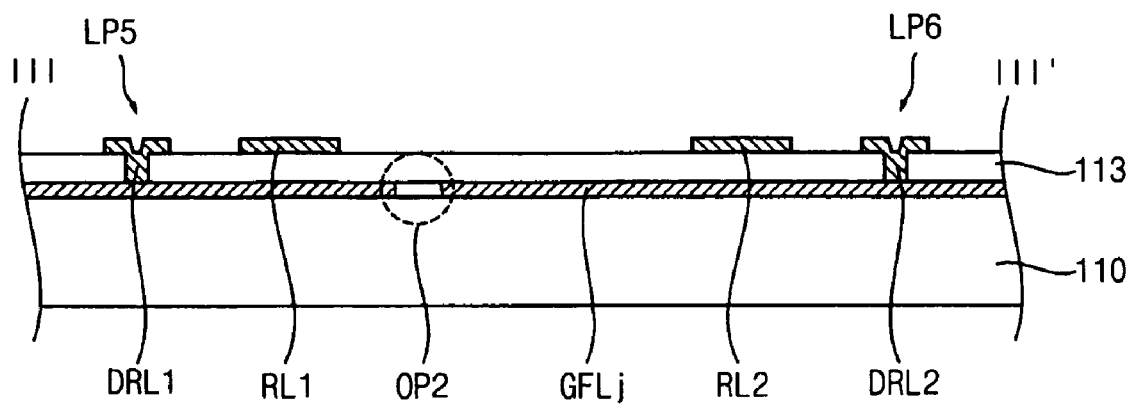
FIG. 5 is a cross-sectional view taken along a line III-III' in FIG. 2.
Figure 6:
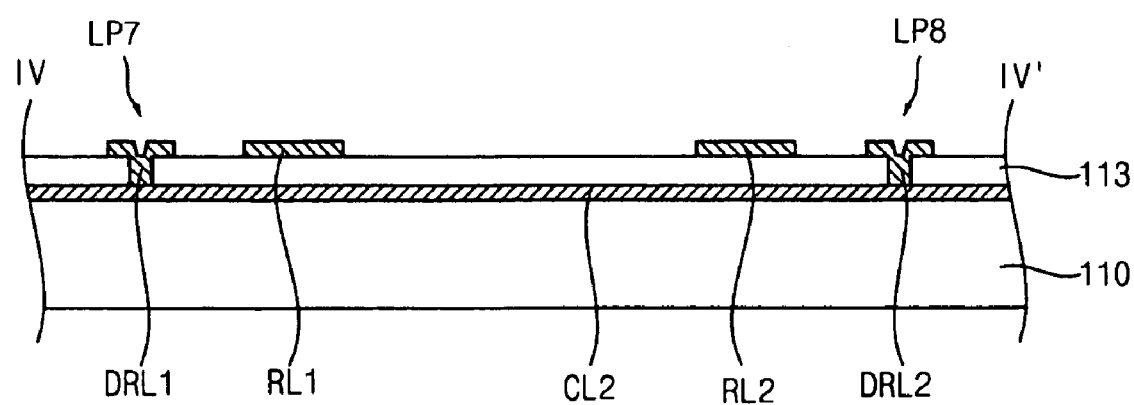
FIG. 6 is a cross-sectional view taken along a line IV-IV' in FIG. 2.

FIG. 5 is a cross-sectional view taken along a line III-III' shown in FIG. 2. FIG. 6 is a cross-sectional view taken along a line IV-IV' shown in FIG. 2.

Referring to FIG. 2 and FIG. 5, the first dummy repair line DRL1 is electrically insulated from a first end portion of the j-th gate signal transmitting line GFLj by a first insulating layer 113. The second dummy repair line DRL2 is electrically insulated from a second end portion of the j-th gate signal transmitting line GFLj by the first insulating layer 113. When a laser beam is irradiated onto a fifth laser point LP5 where the first dummy repair line DRL1 overlaps the first end portion, the first dummy repair line DRL1 may be electrically connected, e.g., coupled, with the first end portion of the j-th gate signal transmitting line GFLj. When a laser beam is irradiated upon a sixth laser point LP6 where the second dummy repair line DRL2 overlaps the second end portion, the second dummy repair line DRL2 may be electrically connected, e.g., coupled, with the second end portion of the j-th gate signal transmitting line GFLj.

As shown in FIG. 2 and FIG. 6, the first dummy connecting line DCL1 is electrically insulated from the first dummy repair line DRL1 and the second dummy repair line DRL2 by the first insulating layer 113. When a laser beam is irradiated upon a seventh laser point LP7 where the first dummy connecting line DCL1 overlaps the first dummy repair line DRL1, the first dummy connecting line DCL1 may be electrically connected, e.g., coupled, with the first dummy repair line DRL1. Also, the first dummy connecting line DCL1 may be electrically connected, e.g., coupled, with the second dummy repair line DRL2 when a laser beam is irradiated upon an eighth laser point LP8 where the first dummy connecting line DCL1 overlaps the second dummy repair line DRL2.

The first dummy connecting line DCL1 is provided on a layer that is different from a layer on which the first dummy repair line DRL1 and the second dummy repair line DRL2, and is electrically connected, e.g., coupled, with the first dummy repair line DRL1 and the second dummy repair line DRL2 through a process of irradiating a laser beam.

Thus, the first end portion and the second end portion of the j-th gate signal transmitting line GFLj are electrically connected, e.g., coupled, with each other via the first dummy repair part DRP1. Therefore, a gate signal from the first end portion of the j-th gate signal transmitting line GFLj may be applied to a j-th gate line after sequentially passing through the first dummy repair line DRL1, the first dummy connecting line DCL1, and the second dummy repair line DRL2.

Returning to FIG. 2, the repair lines RL1, RL2, DRL1, and DRL2 have a first width W1 at an overlapped area where the repair lines RL1, RL2, DRL1 and DRL2 overlap a plurality of gate signal transmitting lines and a second width W2 that is larger than the first width W1 at an area that does not include the overlapped area. This may reduce the overlapped area where the repair lines RL1, RL2, DRL1 and DRL2 overlap the gate signal transmitting lines.

The reduced size of the overlapped area may also reduce the capacitance of a capacitor formed between the repair lines RL1, RL2, DRL1 and DRL2 and the gate signal transmitting lines. Therefore, it may prevent or substantially reduces a line resistance of the gate signal transmitting lines may be reduced and distortion and delay of the gate signal applied to the gate signal transmitting lines.

In FIGS. 2, 4, 5, and 6, a process for repairing the gate signal transmitting lines is described, whereas, the data signal transmitting lines may be repaired by performing a same process as described above with the gate signal transmitting lines.

Figure 7:
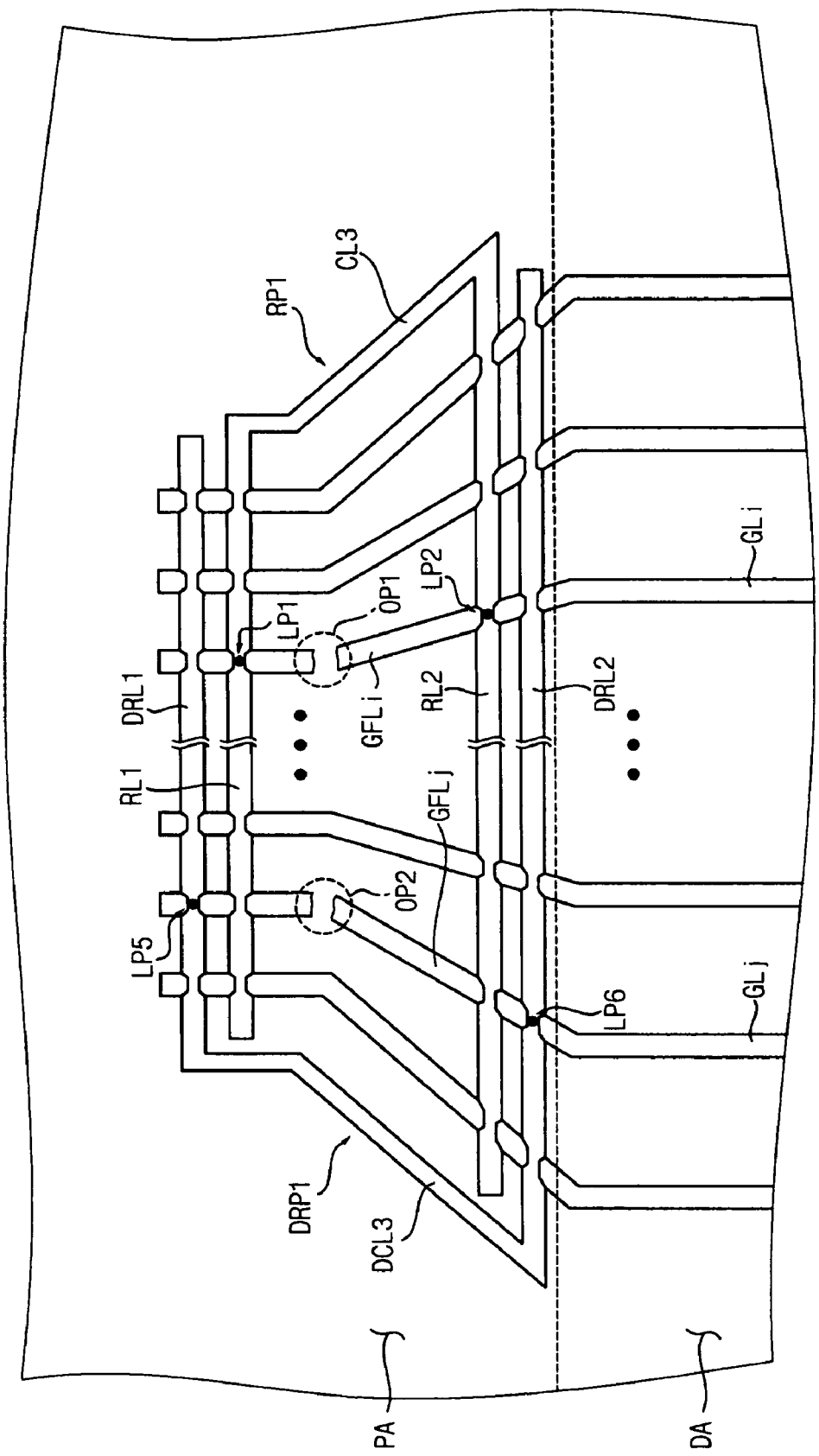
FIG. 7 is a plan view showing a gate signal transmitting portion according to another embodiment of the invention.

FIG. 7 is a plan view showing a gate signal transmitting portion according to another embodiment of the invention. In FIG. 7, the same reference numerals denote the same elements shown in FIG. 2, and thus any further repetitive descriptions of the same elements is omitted as necessary for purposes of convenience.

Referring to FIG. 7, the first repair part RP1 includes the first repair line RL1, the second repair line RL2, and a third connecting line CL3. The first repair line RL1, the second repair line RL2, and the third connecting line CL3 may be formed on a different layer from a layer where the gate signal transmitting lines are formed.

The first repair line RL1 intersects and is insulated from first end portions of the gate signal transmitting lines. The second repair line RL2 intersects and is insulated from second end portions of the gate signal transmitting lines. The third connecting line CL3 extends from the first repair line RL1 and the second repair line RL2 to connect, e.g., couple, the first repair line RL1 with the second repair line RL2 that is spaced apart from the first repair line RL1.

As the i-th gate signal transmitting line GFLi is opened, a laser beam is irradiated upon the first laser point LP1 and the second laser point LP2. Thus, the first repair line RL1 is electrically connected, e.g., coupled, with the first end portion of the i-th gate signal transmitting line GFLi at the first laser point LP1, and the second repair line RL2 is electrically connected, e.g., coupled, with the second end portion of the i-th gate signal transmitting line GFLi at the second laser point LP2.

Therefore, the first end portion and the second end portion of the opened i-th gate signal transmitting line GFLi are electrically connected, e.g., coupled, with each other via the first repair part RP1. As a result, a gate signal provided to the i-th gate signal transmitting line GFLi is transmitted to the i-th gate line GLi after sequentially passing through the first repair line RL1, the third connecting line CL3 and the second repair line RL2.

The first dummy repair part DRP1 includes the first dummy repair line DRL1, the second dummy repair line DRL2, and a third dummy connecting line DCL3. The first dummy repair line DRL1, the second dummy repair line DRL2 and the third connecting line DCL3 may be formed on a different layer from a layer where the gate signal transmitting lines are formed.

The first dummy repair line DRL1 intersects and is insulated from the first end portions of the gate signal transmitting lines, and the second dummy repair line DRL2 intersects and is insulated from the second end portions of the gate signal transmitting lines. The third dummy connecting line DCL3 extends from the first dummy repair line DRL1 and the second dummy repair line DRL2 and connects the first dummy repair line DRL1 with the second dummy repair line DRL2.

As the j-th gate signal transmitting line GFLj opens, the laser beam irradiates the fifth laser point LP5 and the sixth laser point LP6. Thus, the first end portion of the j-th gate signal transmitting line GFLj is electrically connected, e.g., coupled, with the first dummy repair line DRL1 at the fifth laser point LP5, and the second end portion of the j-th gate signal transmitting line GFLj is electrically connected, e.g., coupled, with the second dummy repair line DRL2 at the sixth laser point LP6.

Therefore, the first end portion and the second end portion of the opened j-th gate signal transmitting line GFLj are electrically connected, e.g., coupled, with each other via the first dummy repair part DRP1. As a result, the gate signal provided to the j-th gate signal transmitting line GFLj is transmitted to the j-th gate line GLj after sequentially passing through the first dummy repair line DRL1, the third dummy connecting line DCL3 and the second dummy repair line DRL2.

Figure 8:
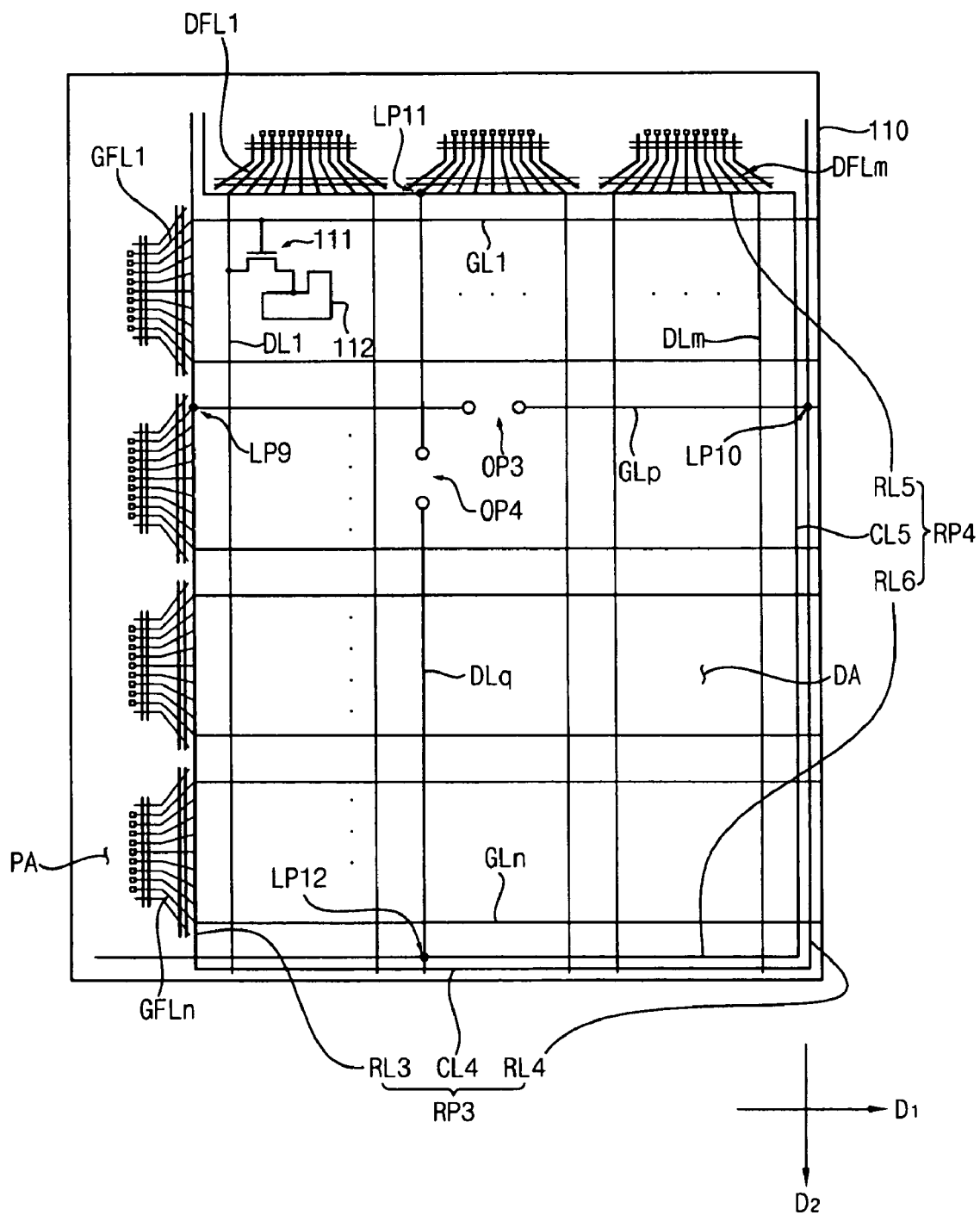
FIG. 8 is a plan view showing an array substrate according to another embodiment of the invention.

FIG. 8 is a plan view showing an array substrate according to another embodiment of the invention. In FIG. 8, the same reference numerals denote the same elements in FIG. 1 and any further repetitive description of the same elements is omitted as necessary for purposes of convenience.

Referring to FIG. 8, an array substrate 102 includes the substrate 110 divided into the display area DA and the peripheral area PA that is adjacent to the display area DA.

The gate lines GL1~GLn and the data lines DL1~DLm are formed at the display area DA of the substrate 110. The gate lines GL1~GLn extend along the first direction D1 and the data lines DL1~DLm extend along the second direction D2, the second direction D2 being substantially perpendicular to the first direction D1. The gate lines GL1~GLn and the data lines DL1~DLm are provided on a different layer from each other, so that the gate lines GL1~GLn and the data lines DL1~DLm are electrically insulated from each other.

The array substrate 102 may further include a third repair part RP3 to repair an opened gate line of the gate lines GL1~GLn, and a fourth repair part RP4 to repair an opened data line of the data lines DL1~DLm.

The third repair part RP3 has a third repair line RL3, a fourth repair line RL4 and a fourth connecting line CL4. The third repair line RL3 intersects and is insulated from first end portions of the gate lines GL1~GLn, and the fourth repair line RL4 intersects and is insulated from second end portions of the gate lines GL1~GLn. The third repair line RL3 and the fourth repair line RL4 are spaced apart from each other and are electrically connected, e.g., coupled, with each other via the fourth connecting line CL4.

When a p-th gate line GLp opens at a third opened area OP3, a laser beam irradiates upon a ninth laser point LP9 and the tenth laser point LP10. Thus, the third repair line RL3 is electrically connected, e.g., coupled, with a first end portion of the p-th gate line GLp, and the fourth repair line RL4 is electrically connected, e.g., coupled, with a second end portion of the p-th gate line GLp.

Therefore, a gate signal applied to the first end portion of the p-th gate line GLp is transmitted to the second end portion after sequentially passing through the third repair line RL3, the fourth connecting line CL4 and the fourth repair line RL4.

The fourth repair part RP4 may include a fifth repair line RL5, a sixth repair line RL6, and a fifth connecting line CL5. The fifth repair line RL5 intersects and is insulated from first end portions of the data lines DL1~DLm. The sixth repair line RL6 intersects and is insulated from second end portions of the data lines DL1~DLm. The fifth repair line RL5 and the sixth repair line RL6 are spaced apart from each other and are electrically connected, e.g., coupled, with each other via the fifth connecting line CL5.

When a q-th data line DLq opens at a fourth opened area OP4, a laser beam irradiates upon an eleventh laser point LP11 and a twelfth laser point LP12. Thus, the fifth repair line RL5 is electrically connected, e.g., coupled, with a first end portion of the q-th data line DLq and the sixth repair line RL6 is electrically connected, e.g., coupled, with a second end portion of the q-th data line DLq.

Therefore, a data signal applied to the first end portion of the q-th data line DLq is transmitted to the second end portion after sequentially passing through the fifth repair line RL5, the sixth connecting line CL6 and the sixth repair line RL6.

Although not shown in figures, a third dummy repair part to repair another opened gate line of the gate lines GL1~GLn and a fourth dummy repair part to repair another opened data line of the data lines DL1~DLm may be formed on the first substrate 110.

Figure 9:
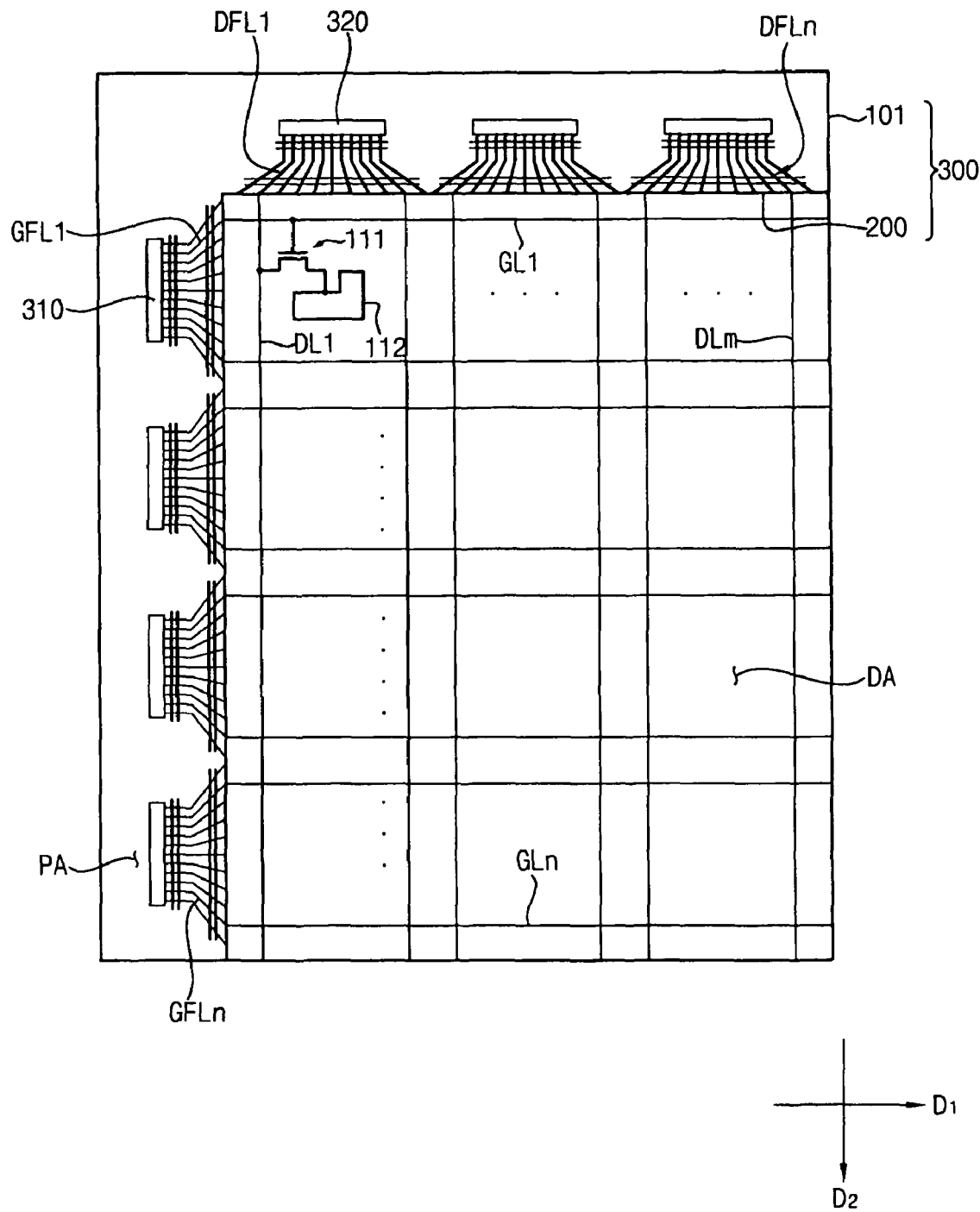
FIG. 9 is a plan view showing a display apparatus having the array substrate of FIG. 1.

FIG. 9 is a plan view a display apparatus having the array substrate of FIG. 1. In FIG. 9, the same reference numerals refer to the same elements in FIG. 1 and any further description of the same elements is omitted as necessary for purpose of convenience.

Referring to FIG. 9, a display apparatus 400 displaying an image includes the array substrate 100, an opposite substrate 200 facing the array substrate 100, and a liquid crystal layer (not shown). The display apparatus 400 may further include a plurality of gate driving chips 310 outputting the gate signal and a plurality of data driving chips 320 outputting the data signal.

The gate driving chips 310 are mounted or provided on the array substrate 100 corresponding to the peripheral area PA to connect with the gate signal transmitting lines GFL1~GFLn. In the embodiment shown in FIG. 9, the gate signal transmitting lines GFL1~GFLn may be divided into four groups, and the four groups receive the gate signal from the gate driving chips 310.

The data driving chips 320 are mounted or provided on the array substrate 100 corresponding to the peripheral area PA to connect with the data signal transmitting lines DFL1~DFLm. In the embodiment shown in FIG. 9, the data signal transmitting lines DFL1~DFLm are divided into three groups, and the three groups receive the data signal from the data driving chips 320.

Therefore, the display apparatus 400 displays the image in response to the gate signals and the data signals from the gate driving chip 310 and the data driving chip 320, respectively.

According to the array substrate, the display apparatus having the same and the method for repairing the same, the repair part intersects and is insulated from the signal transmitting lines so that only the signal transmitting lines are repaired. Therefore, the repair part may repair an open signal transmitting line, which increases the manufacturing yield of the array substrate.

Also, the repair part intersects and is insulated from only the signal transmitting lines and does not intersect with the gate lines and the date lines. Therefore, the array substrate prevents distortion of the gate signals and the data signals that are applied to the gate lines and the data lines, respectively.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate, comprising:
   a substrate comprising a display area and a peripheral area that is adjacent to the display area;
   a pad disposed on the peripheral area;
   a first signal line disposed on the peripheral area and coupled with the pad;
   a second signal line disposed on the display area and coupled with the first signal line;
   a first crossing line disposed between the pad and the display area, crossing the first signal line, and insulated from the first signal line;
   a second crossing line disposed between the first crossing line and the display area, crossing the first signal line, and insulated from the first signal line; and
   a first dummy signal line crossing the first crossing line and the second crossing line,
   wherein the first crossing line and the second crossing line have a first width in a first area and a second width that is wider than the first width in a second area, the first crossing line and the second crossing line overlapping with the first signal line in the first area.

2. The array substrate of claim 1, wherein the first crossing line is insulated from a first end portion of the first signal line and the second crossing line is insulated from a second end portion of the first signal line.

3. The array substrate of claim 2, wherein the first crossing line and the second crossing line are disposed on a different layer from the first signal line.

4. The array substrate of claim 2, wherein the first signal line includes additional first signal lines and the first and second crossing lines repair a first opened signal line of the first signal lines.

5. The array substrate of claim 4, wherein the first crossing line is coupled with the first end portion of the first opened signal line by irradiating a laser beam upon a first overlap portion between the first crossing line and the first opened signal line, and the second crossing line is coupled with a second end portion of the first opened signal line by irradiating a laser beam upon a second overlap portion between the second crossing line and the first opened signal line.

6. The array substrate of claim 2, wherein the first dummy signal line couples the first crossing line with the second crossing line.

7. The array substrate of claim 6, wherein the first dummy signal line is disposed on a different layer than the first crossing line and the second crossing line.

8. The array substrate of claim 7, wherein the first dummy signal line is coupled with the first crossing line and the second crossing line by irradiating a laser beam upon a third overlap portion where the first crossing line and the second crossing line overlap with the first dummy signal line, and a fourth overlap portion where the first crossing line and the second crossing line overlap with the first dummy signal line.

9. The array substrate of claim 6, wherein the first dummy signal line is disposed on a same layer as the first crossing line and the second crossing line.

10. The array substrate of claim 1, further comprising:
    a first dummy crossing line disposed between the pad and the display area, crossing the first signal line, and insulated from the first signal line;
    a second dummy crossing line disposed between the first dummy crossing line and the display area, crossing the first signal line, and insulated from the first signal line; and
    a second dummy signal line coupling the first dummy crossing line with the second dummy crossing line.

11. The array substrate of claim 10, wherein the first dummy crossing line and the second dummy crossing line are disposed on a different layer than the first signal line, the second dummy signal line being disposed on a same layer as the first signal line.

12. The array substrate of claim 11, wherein the first signal line includes additional first signal lines and the first and second dummy crossing lines repair a second opened signal line of the first signal lines.

13. The array substrate of claim 1, wherein the second signal line comprises:
   a gate line to receive a gate signal of the driving signal; and
   a data line to receive a data signal of the driving signal, the data line being disposed on a different layer than the gate line and intersecting the gate line.

14. The array substrate of claim 13, further comprising:
   a gate line crossing part intersecting and insulated from the gate line in order to repair an opened gate line, the gate line crossing part being coupled with the opened gate line; and
   a data line crossing part intersecting and insulated from the data line in order to repair an opened data line, the data line crossing part being coupled with the opened data line.

15. A display apparatus comprising:
   an array substrate comprising:
   a substrate comprising a display area and a peripheral area that is adjacent to the display area;
   a pad disposed on the peripheral area;
   a first signal line disposed on the peripheral area and coupled with the pad;
   a second signal line disposed on the display area and coupled with the first signal line;
   a first crossing line disposed between the pad and the display area, crossing the first signal line, and insulated from the first signal line;
   a second crossing line disposed between the first crossing line and the display area, crossing the first signal line, and insulated from the first signal line; and
   a dummy signal line crossing the first crossing line and the second crossing line;
   an opposite substrate facing the array substrate; and
   a driving part on the array substrate to output a driving signal,
   wherein the first crossing line and the second crossing line have a first width in a first area and a second width that is wider than the first width in a second area, the first crossing line and the second crossing line overlapping with the first signal line in the first area.

16. The display apparatus of claim 15, wherein the driving part comprises:
   a gate driving part to output a gate signal of the driving signal; and
   a data driving part to output a data signal of the driving signal.

17. The display apparatus of claim 16, wherein the second signal line comprises:
   a first gate signal line to receive the gate signal; and
   a first data signal line to receive a data signal of the driving signal, the first data signal line being disposed on a different layer than the first gate signal line and intersecting the first gate signal line.

18. The display apparatus of claim 17, wherein the first signal line comprises:
   a second gate signal line positioned between the first gate line and the gate driving part to provide the first gate signal line with the gate signal from the gate driving part; and
   a second data signal line positioned between the first data signal line and the data driving part to provide the first data signal line with the data signal from the data driving part.

19. A display apparatus, comprising:
   an array substrate comprising;
   a substrate comprising a display area and a peripheral area that is adjacent to the display area;
   a gate pad disposed on the peripheral area;
   a data pad disposed on the peripheral area;
   a first gate signal line part disposed on the peripheral area and coupled with the gate pad;
   a first data signal line part disposed on the peripheral area and coupled with the data pad;
   a second gate signal line part provided at the display area, the second gate signal line part being coupled with the first gate signal line part to receive a gate signal from the first gate signal line part;
   a second data signal line part provided at the display area of the substrate, the second data signal line part being coupled with the first data signal line part to receive a data signal from the first data signal line part;
   a first crossing line disposed between the gate pad and the display area, crossing the first gate signal line part, and insulated from the first gate signal line part;
   a second crossing line disposed between the first crossing line and the display area, crossing the first gate signal line part, and insulated from the first gate signal line part;
   a first dummy signal line crossing the first crossing line and the second crossing line;
   a dummy gate side repair part to repair an opened second gate signal line part;
   a third crossing line disposed between the data pad and the display area, crossing the first data signal line part, and insulated from the first data signal line part;
   a fourth crossing line disposed between the third crossing line and the display area, crossing the first data signal line part, and insulated from the first data signal line part;
   a second dummy signal line crossing the third crossing line and the fourth crossing line; and
   a dummy data side repair part to repair an opened second data signal line part;
   an opposite substrate corresponding to the array substrate;
   a gate driving chip provided at the array substrate to transmit the gate signal; and
   a data driving chip provided at the array substrate to transmit the date signal,
   wherein the first crossing line and the second crossing line have a first width in a first area and a second width that is wider than the first width in a second area, the first crossing line and the second crossing line overlapping with the first gate signal line part in the first area.

20. The display apparatus of claim 19, wherein the first gate signal line part is provided between the gate driving chip and the second gate signal line part, and the first data signal line part is provided between the data driving chip and the second data signal line part.

21. The display apparatus of claim 20, wherein the first gate signal line part comprises a plurality of first gate signal lines, and the second gate signal line part comprises a plurality of second gate signal lines.

22. The display apparatus of claim 21, wherein a distance between each of the first gate signal lines is less than a distance between each of the second gate signal lines, and wherein a distance between each of the first data signal lines is less than a distance between each of the second data signal lines.

23. The display apparatus of claim 20, wherein the first gate signal line part comprises a plurality of first groups having a substantially fan-like shape, and the first data signal line part comprises a plurality of second groups having a substantially fan-like shape.

* * * * *